US011790212B2

(12) United States Patent
Ovtcharov et al.

(10) Patent No.: US 11,790,212 B2
(45) Date of Patent: Oct. 17, 2023

(54) QUANTIZATION-AWARE NEURAL ARCHITECTURE SEARCH

(71) Applicant: Microsoft Technology Licensing, LLC, Redmond, WA (US)

(72) Inventors: Kalin Ovtcharov, Snoqualmie, WA (US); Eric S. Chung, Redmond, WA (US); Vahideh Akhlaghi, Redmond, WA (US); Ritchie Zhao, Ithaca, NY (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1056 days.

(21) Appl. No.: 16/357,213

(22) Filed: Mar. 18, 2019

(65) Prior Publication Data

US 2020/0302271 A1   Sep. 24, 2020

(51) Int. Cl.
*G06N 3/00* (2023.01)
*G06F 7/483* (2006.01)
*G06N 3/045* (2023.01)
*G06N 3/063* (2023.01)

(52) U.S. Cl.
CPC ............. *G06N 3/045* (2023.01); *G06F 7/483* (2013.01); *G06N 3/063* (2013.01)

(58) Field of Classification Search
CPC ....... G06N 3/0454; G06N 3/063; G06F 7/483
USPC ........................................................ 706/15
See application file for complete search history.

(56) References Cited

U.S. PATENT DOCUMENTS

| 2016/0328646 A1* | 11/2016 | Lin ........................... G06N 3/04 |
| 2019/0042945 A1* | 2/2019 | Majumdar ............... G06N 3/04 |
| 2019/0096659 A1* | 3/2019 | Xu ........................ G06N 3/0454 |
| 2019/0122100 A1* | 4/2019 | Kang ........................ G06F 7/57 |
| 2019/0251439 A1* | 8/2019 | Zoph .................... G06K 9/6262 |

OTHER PUBLICATIONS

Lu, et al., "On Neural Architecture Search for Resource-Constrained Hardware Platforms", In the Journal of Computing Research Repository., Oct. 31, 2019, 8 Pages.

(Continued)

*Primary Examiner* — Hai Tao Sun
(74) *Attorney, Agent, or Firm* — Newport IP, LLC; Leonard J. Hope

(57) ABSTRACT

Quantization-aware neural architecture search ("QNAS") can be utilized to learn optimal hyperparameters for configuring an artificial neural network ("ANN") that quantizes activation values and/or weights. The hyperparameters can include model topology parameters, quantization parameters, and hardware architecture parameters. Model topology parameters specify the structure and connectivity of an ANN. Quantization parameters can define a quantization configuration for an ANN such as, for example, a bit width for a mantissa for storing activation values or weights generated by the layers of an ANN. The activation values and weights can be represented using a quantized-precision floating-point format, such as a block floating-point format ("BFP") having a mantissa that has fewer bits than a mantissa in a normal-precision floating-point representation and a shared exponent.

17 Claims, 8 Drawing Sheets

(56) References Cited

OTHER PUBLICATIONS

Liu, et al., "DARTS: Differentiable Architecture Search", In Journal of Computing Research Repository, Jun. 2018, pp. 1-12.
"Neural Architecture Search with Controller RNN", Retrieved from: https://github.com/titu1994/neural-architecture-search, Retrieved on Nov. 29, 2018, 3 Pages.
"International Search Report and Written Opinion Issued in PCT Application No. PCT/US20/021620", dated Jun. 17, 2020, 14 Pages.
Xu, et al., "DNQ: Dynamic Network Quantization", In the Journal of Computing Research Repository., Dec. 6, 2018, 10 Pages.
Yazdanbakhsh, et al., "ReLeQ: An Automatic Reinforcement Learning Approach for Deep Quantization of Neural Networks", In the Repository of arXiv:1811.01704v2, Dec. 10, 2018, 9 Pages.
Zoph, et al., "Neural Architecture Search with Reinforcement Learning", In Journal of Computing Research Repository, Nov. 5, 2016, 15 Pages.

\* cited by examiner

QUANTIZATION-AWARE NEURAL ARCHITECTURE SEARCH

QUANTIZATION-AWARE NEURAL ARCHITECTURE SEARCH

BACKGROUND

Artificial neural networks ("ANNs" or "NNs") are applied to a number of applications in Artificial Intelligence ("AI") and Machine Learning ("ML"), including image recognition, speech recognition, search engines, and other suitable applications. ANNs are typically trained across multiple "epochs." In each epoch, an ANN trains over all of the training data in a training data set in multiple steps. In each step, the ANN first makes a prediction for an instance of the training data (which might also be referred to herein as a "sample"). This step is commonly referred to as a "forward pass" (which might also be referred to herein as a "forward training pass").

To make a prediction, a training data sample is fed to the first layer of the ANN, which is commonly referred to as an "input layer." Each layer of the ANN then computes a function over its inputs, often using learned parameters, or "weights," to produce an input for the next layer. The output of the last layer, commonly referred to as the "output layer," is a class prediction, commonly implemented as a vector indicating the probabilities that the sample is a member of a number of classes. Based on the label predicted by the ANN and the actual label of each instance of training data, the output layer computes a "loss," or error function.

In a "backward pass" (which might also be referred to herein as a "backward training pass") of the ANN, each layer of the ANN computes the error for the previous layer and the gradients, or updates, to the weights of the layer that move the ANN's prediction toward the desired output. The result of training a ANN is a set of weights, or "kernels," that represent a transform function that can be applied to an input with the result being a classification, or semantically labeled output.

After an ANN is trained, the trained ANN can be used to classify new data. Specifically, a trained ANN model can use weights and biases computed during training to perform tasks (e.g. classification and recognition) on data other than that used to train the ANN. General purpose central processing units ("CPUs"), special purpose processors (e.g. graphics processing units ("GPUs"), tensor processing units ("TPUs") and field-programmable gate arrays ("FPGAs")), and other types of hardware can be used to execute an ANN model.

ANNs commonly use normal-precision floating-point formats (e.g. 16-bit, 32-bit, 64-bit, and 80-bit floating point formats) for internal computations. Performance, energy usage, and storage requirements of ANNs can, however, be improved through the use of quantized-precision floating-point formats during training and/or inference. Examples of quantized-precision floating-point formats include formats having a reduced bit width (including by reducing the number of bits used to represent a number's mantissa or exponent) and block floating-point ("BFP") formats that use a small (e.g. 3, 4, or 5-bit) mantissa and an exponent shared by two or more numbers. The use of quantized-precision floating-point formats can, however, have certain negative impacts on ANNs such as, but not limited to, a loss in accuracy.

It is with respect to these and other technical challenges that the disclosure made herein is presented.

SUMMARY

Technologies are disclosed herein for quantization-aware neural architecture search ("QNAS"). Through implementations of the disclosed technologies, the accuracy and/or inference time of ANNs that utilize quantized-precision floating-point formats can be improved by utilizing neural architecture search ("NAS") to learn an optimized architecture for an ANN that utilizes such a format. In this way, the technical benefits resulting from the use of quantized-precision floating-point formats can be retained, while at the same time maintaining, or possibly improving, ANN accuracy or inference time as compared to ANNs that use normal-precision floating-point formats. Other technical benefits can be realized through implementations of the disclosed technologies.

In order to provide the technical benefits mentioned above, and potentially others, neural architecture search ("NAS") techniques can be utilized to identify an architecture for a quantized ANN (this process is generally referred to herein as QNAS). NAS generally refers to a ML-based process for predicting optimized hyperparameters that specify the structure and connectivity of an ANN. Such hyperparameters can include, but are not limited to, parameters specifying the number of layers of an ANN, number of filters, filter height, filter width, stride height, and stride width.

In addition to hyperparameters specifying the structure and connectivity of an ANN, the disclosed technologies can also predict optimized quantization parameters and, in some embodiments, hardware architecture parameters for configuring aspects of the operation of an FPGA that implements an ANN. Quantization parameters define a quantization configuration for an ANN. For example, and without limitation, the quantization parameters can define a bit width for a mantissa for storing activation values generated by layers of an ANN. Quantization parameters might also, or alternately, define a bit width for a mantissa for storing weights for an ANN. The activation values and weights can be represented using a quantized-precision floating-point format, such as a BFP format having a mantissa that has fewer bits than a mantissa in a normal-precision floating-point representation and a shared exponent.

In some embodiments, a recurrent neural network ("RNN") is utilized to perform a QNAS. In particular, an RNN can generate hyperparameters, including model topology parameters and quantization parameters, for an ANN. A child neural network is then configured according to the hyperparameters and trained on a training data set.

Once the child neural network has been trained, metrics for the trained child neural network can be obtained such as, but not limited to, accuracy, inference time, or inference cost. One or more of the metrics can then be utilized as a reward signal for performing reinforcement learning to train the RNN to generate a new set of hyperparameters, including another set of quantization parameters for another child network.

The process described above can then be repeated in order to create, train and evaluate additional child neural networks. This process can be repeated for a specified number of iterations or until hyperparameters can be generated defining an ANN architecture that satisfies constraints on accuracy or inference time.

Following the process described above, the hyperparameters that optimize one or more metrics can be identified and utilized to create and implement a quantized ANN. For example, and without limitation, a set of hyperparameters that optimizes an ANN for accuracy and/or inference time might be selected.

It should be noted that applications of the QNAS disclosed herein can be used with various types of neural networks, such as convolutional neural networks ("CNNs"), including implementations having Long Short-Term Memory ("LSTMs") or gated recurrent units ("GRUs"), or other suitable ANNs that can be adapted to use the QNAS technologies disclosed herein.

It should also be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
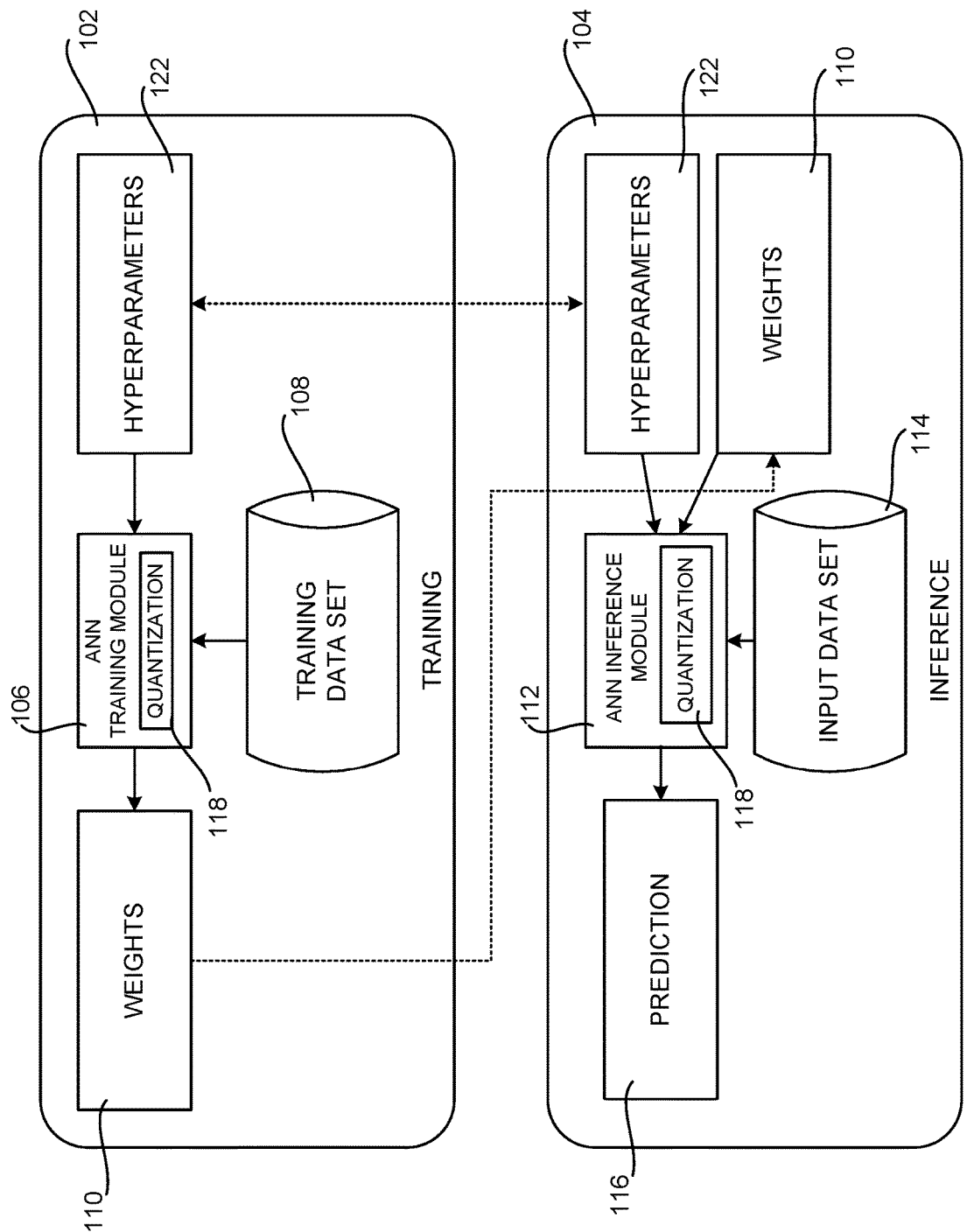
FIG. 1 is a computing architecture diagram that shows aspects of the configuration of a computing system disclosed herein that is capable of quantizing activations and weights during ANN training and inference, according to one embodiment disclosed herein.

The following detailed description is directed to technologies for quantization-aware neural architecture search. In addition to other technical benefits, the disclosed technologies can improve the accuracy or inference time of ANNs that use quantized-precision floating-point formats. This can conserve computing resources including, but not limited to, memory, processor cycles, network bandwidth, and power. Other technical benefits not specifically identified herein can also be realized through implementations of the disclosed technologies.

Referring now to the drawings, in which like numerals represent like elements throughout the several FIGS., aspects of various technologies for quantization-aware neural architecture search will be described. In the following detailed description, references are made to the accompanying drawings that form a part hereof, and which are shown by way of illustration specific configurations or examples.

Overview of ANNs and ANN Training

Figure 2A:
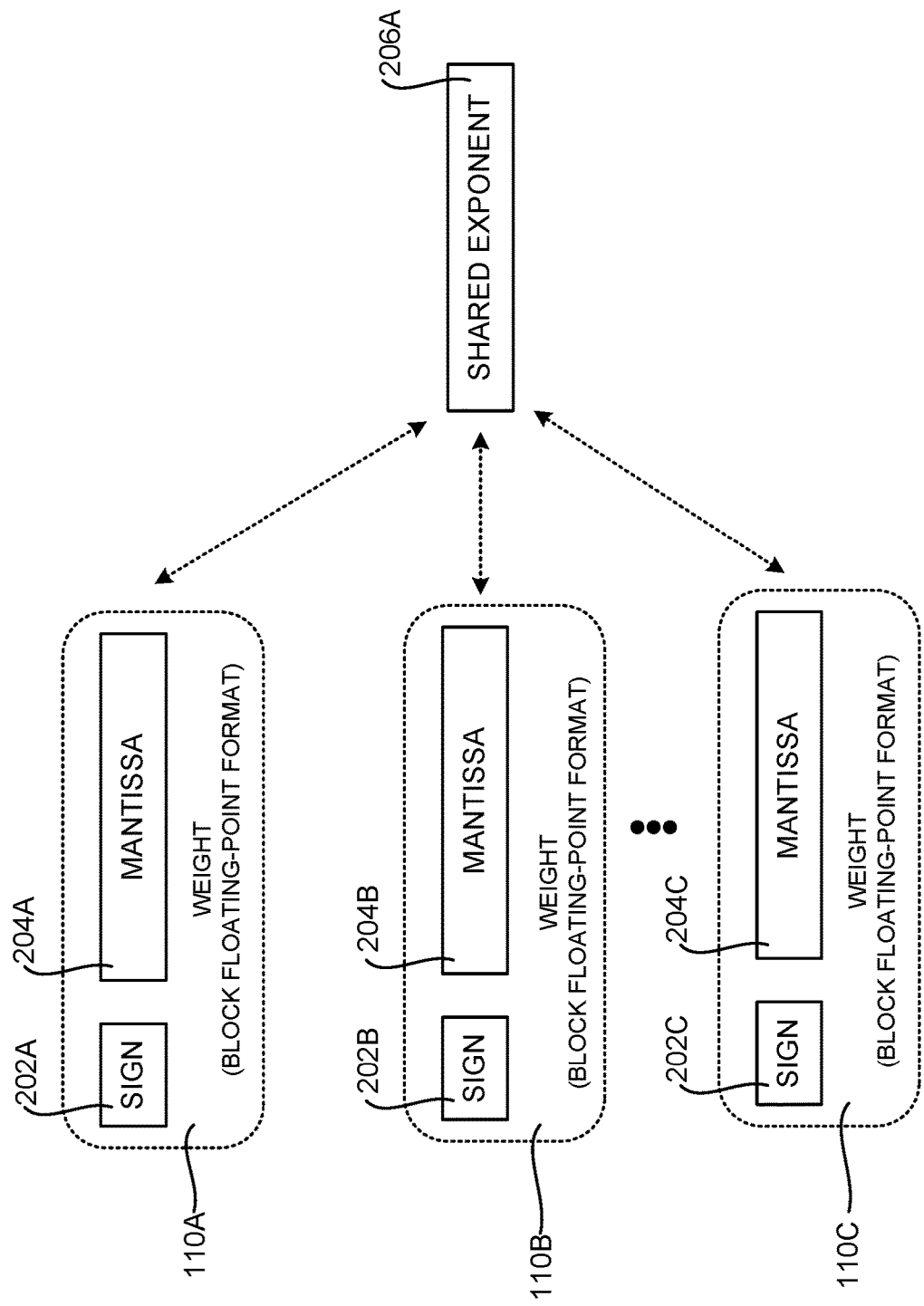
FIGS. 2A and 2B are data structure diagrams showing aspects of one mechanism for using a quantized-precision floating-point format to represent weights and activation values in an ANN, according to one embodiment disclosed herein.
Figure 2B:
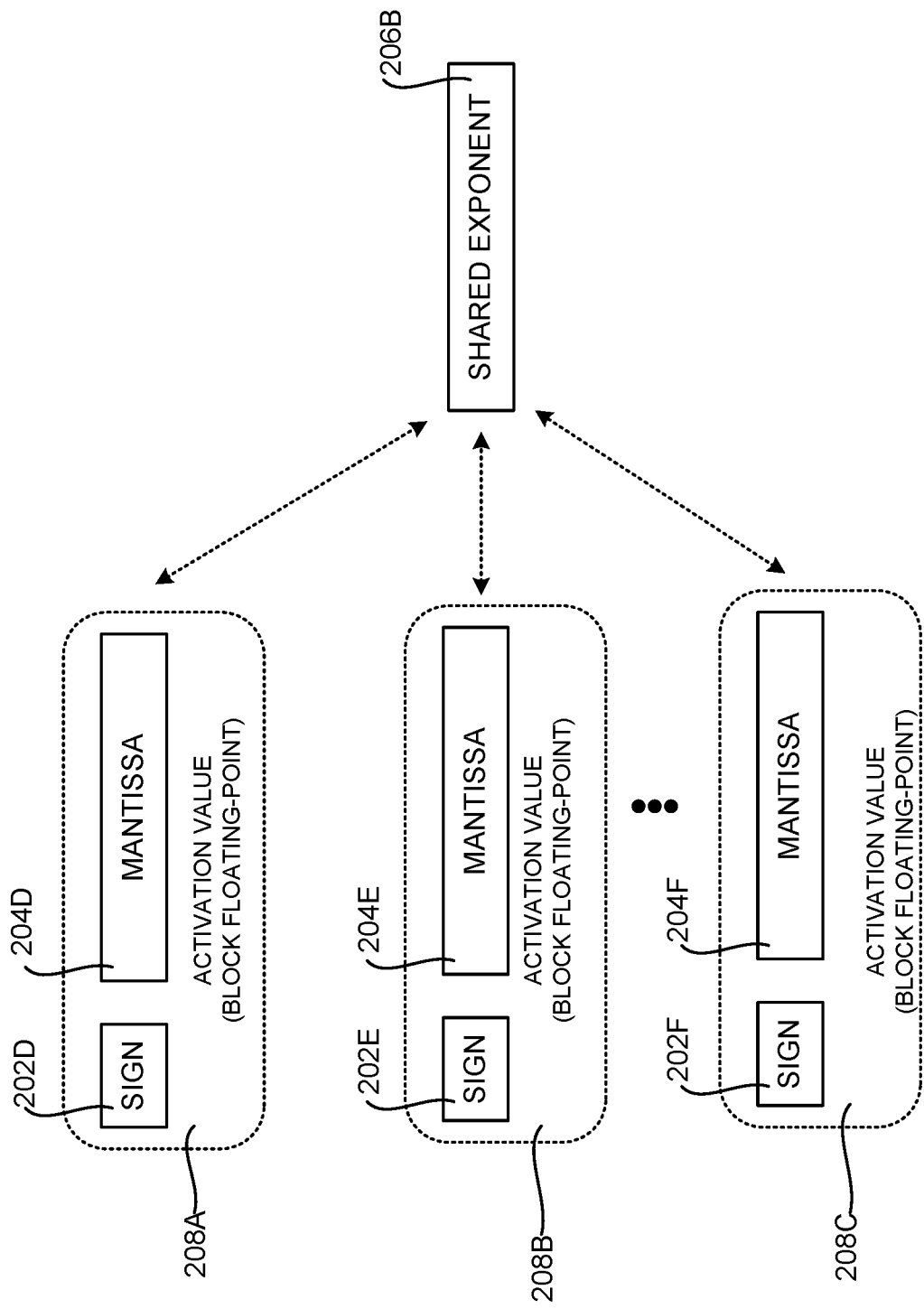

Prior to describing the disclosed technologies for quantization-aware neural architecture search, a brief overview of ANNs, ANN training, and quantization will be provided with reference to FIGS. 1-2B. As described briefly above, ANNs are applied to a number of applications in AI and ML including, but not limited to, recognizing images or speech, classifying images, translating speech to text and/or to other languages, facial or other biometric recognition, natural language processing ("NLP"), automated language translation, query processing in search engines, automatic content selection, analyzing email and other electronic documents, relationship management, biomedical informatics, identifying candidate biomolecules, providing recommendations, or other classification and AI tasks.

The processing for the applications described above may take place on individual devices such as personal computers or cell phones, but it might also be performed in datacenters. Hardware accelerators can also be used to accelerate ANN processing, including specialized ANN processing units, such as TPUs, FPGAs, and GPUs programmed to accelerate NN processing. Such hardware devices can be deployed in consumer devices as well as in data centers due to their flexible nature and low power consumption per unit computation.

An ANN generally consists of a sequence of layers of different types (e.g. convolution, ReLU, fully connected, and pooling layers). As shown in FIG. 1, hyperparameters 122 can define the topology of an ANN. For instance, the hyperparameters 122 can include topology parameters that define the topology, or structure, of an ANN including, but not limited to, the number and type of layers, groupings of layers, connections between the layers, and the number of filters. The hyperparameters 122 can also define other aspects of the configuration and/or operation of an ANN.

Training 102 of ANNs typically utilizes a training data set 108. The training data set 108 includes samples (e.g. images) for applying to an ANN and data describing a desired output from the ANN for each respective sample in the training data set 108 (e.g. a set of images that have been labeled with data describing the actual content in the images).

ANNs are typically trained across multiple "epochs." In each epoch, an ANN training module 106, or another component, trains an ANN over the training data in a training data set 108 in multiple steps. In each step, the ANN first makes a prediction for an instance of the training data (which might also be referred to herein as a "sample"). This step is commonly referred to as a "forward pass" (which might also be referred to herein as a "forward training pass").

To make a prediction, a training data sample is fed to the first layer of the ANN, which is commonly referred to as an "input layer." Each layer of the ANN then computes a function over its inputs, often using learned parameters, or "weights 110" to produce an output (commonly referred to as an "activation"), which is used as an input for the next layer. The output of the last layer, commonly referred to as the "output layer," is a class prediction, commonly implemented as a vector indicating the probabilities that the sample is a member of a number of classes. Based on the label predicted by the ANN and the label associated with each instance of training data in the training data set 108, the output layer computes a "loss," or error function.

In a "backward pass" (which might also be referred to herein as a "backward training pass") of the ANN, each layer of the ANN computes the error for the previous layer and the gradients, or updates, to the weights 110 of the layer that move the ANN's prediction toward the desired output. The result of training an ANN is a set of weights 110 that represent a transform function that can be applied to an input with the result being a prediction 116. A modelling framework such as those described below can be used to train an ANN in this manner.

After an ANN model has been trained, a component of a modelling framework (e.g. the ANN inference module 112 shown in FIG. 1) can be used during inference 104 to make a prediction 116 regarding the classification of samples in an input data set 114 that are applied to the trained ANN. Specifically, the topology of an ANN is configured using the hyperparameters 112 that were used during training 102. The ANN then uses the weights 110 (and biases) obtained during training 102 to perform classification, recognition, or other types of tasks on samples in an input data set 114, typically samples that were not used during training. Such a modelling framework can use general purpose CPUs, special purpose processors (e.g. GPUs, TPUs, or FPGAs), and other types of hardware to execute an ANN and generate predictions 116 in this way.

In some examples, proprietary or open source libraries or frameworks are utilized to facilitate ANN creation, training 102, evaluation, and inference 104. Examples of such libraries include, but are not limited to, TENSORFLOW, MICROSOFT COGNITIVE TOOLKIT ("CNTK"), CAFFE, THEANO, and KERAS. In some examples, programming tools such as integrated development environments ("IDEs") provide support for programmers and users to define, compile, and evaluate ANNs.

Tools such as those identified above can be used to define, train, and use ANNs. As one example, a modelling framework can include pre-defined application programming interfaces ("APIs") and/or programming primitives that can be used to specify one or more aspects of an ANN, such as the hyperparameters 122. These pre-defined APIs can include both lower-level APIs (e.g., activation functions, cost or error functions, nodes, edges, and tensors) and higher-level APIs (e.g., layers, convolutional NNs, recurrent NNs, linear classifiers, and so forth).

"Source code" can be used as an input to such a modelling framework to define a topology of the graph of a given ANN. In particular, APIs of a modelling framework can be instantiated and interconnected using source code to specify a complex ANN model. Different ANN models can be defined by using different APIs, different numbers of APIs, and interconnecting the APIs in different ways. ANNs can be defined, trained, and implemented using other types of tools in other configurations.

Overview of Quantized Artificial Neural Networks

A typical floating-point representation in a computer system consists of three parts: a sign, a mantissa, and an exponent. The sign indicates if the number is positive or negative. The mantissa determines the precision to which numbers can be represented. In particular, the precision of the representation is determined by the precision of the mantissa. Common floating-point representations use a mantissa of 10 (float 16), 24 (float 32), or 53 (float64) bits in width. The exponent modifies the magnitude of the mantissa.

Traditionally, ANNs have been trained and deployed using normal-precision floating-point format (e.g. 32-bit floating-point or "float 32" format) numbers. As used herein, the term "normal-precision floating-point" refers to a floating-point number format having a sign, mantissa, and a per-number exponent. Examples of normal-precision floating-point formats include, but are not limited to, IEEE 754 standard formats, such as 16-bit, 32-bit, or 64-bit formats.

Performance, energy usage, and storage requirements of ANNs can be improved through the use of quantized-precision floating-point formats during training and/or inference. In particular, weights 110 and activation values (shown in FIGS. 2A and 2B) can be represented in a lower-precision quantized-precision floating-point format, which typically results in some amount of error being introduced. Examples of quantized-precision floating-point formats include formats having a reduced bit width (including by reducing the number of bits used to represent a number's mantissa or exponent) and block floating-point ("BFP") formats that use a small (e.g. 3, 4, or 5-bit) mantissa and an exponent shared by two or more numbers.

As shown in FIG. 1, quantization 118 can be utilized during both training 102 and inference 104. In particular, weights 110 and activation values generated by an ANN can be quantized through conversion from a normal-precision floating-point format (e.g. 16-bit or 32-bit floating point numbers) to a quantized-precision floating-point format. On certain types of hardware, such as FPGAs, the utilization of quantized-precision floating-point formats can greatly improve the latency and throughput of ANN processing.

As used herein, the term "quantized-precision floating-point" refers to a floating-point number format where two or more values of a floating-point number have been modified to have a lower precision than when the values are represented in normal-precision floating-point. In particular, some examples of quantized-precision floating-point representations include BFP formats, where two or more floating-point numbers are represented with reference to a common exponent.

A BFP format number can be generated by selecting a common exponent for two, more, or all floating-point numbers in a set and shifting mantissas of individual elements to match the shared, common exponent. Accordingly, for purposes of the present disclosure, the term "BFP" means a number system in which a single exponent is shared across two or more values, each of which is represented by a sign and mantissa pair (whether there is an explicit sign bit, or the mantissa itself is signed).

Thus, and as illustrated in FIGS. 2A and 2B, sets of floating-point numbers can be represented using a BFP floating-point format by a single shared exponent value, while each number in the set of numbers includes a sign and a mantissa. For example, and as illustrated in FIG. 2A, the weights 110A-110C generated by an ANN can each include a per-weight sign 202A-202C and a per-weight mantissa 204A-204C, respectively. However, the weights 110A-110C share a common exponent 206A. Similarly, and as shown in FIG. 2B, the activation values 208A-208C generated by an ANN can each include a per-activation value sign 202D-202F and a per-activation value mantissa 204D-204F, respectively. The activation values 208A-208C, however, share a common exponent 206B. In some examples, the shared exponent 206 for a set of BFP numbers is chosen to be the largest exponent of the original floating-point values.

Use of a BFP format, such as that illustrated in FIGS. 2A and 2B, can reduce computational resources required for certain common ANN operations. For example, for numbers represented in a normal-precision floating-point format, a floating-point addition is required to perform a dot product operation. In a dot product of floating-point vectors, summation is performed in floating-point, which can require shifts to align values with different exponents. On the other hand, for a dot product operation using BFP format floating-point numbers, the product can be calculated using integer arithmetic to combine mantissa elements. As a result, a large dynamic range for a set of numbers can be maintained with the shared exponent while reducing computational costs by using more integer arithmetic, instead of floating-point arithmetic.

BFP format floating-point numbers can be utilized to perform training operations for layers of an ANN, including forward propagation and back propagation. The values for one or more of the ANN layers can be expressed in a quantized format that has lower precision than normal-precision floating-point formats. For example, BFP formats can be used to accelerate computations performed in training and inference operations using a neural network accelerator, such as an FPGA.

Further, portions of ANN training, such as temporary storage of activation values 208, can be improved by compressing a portion of these values (e.g., for an input, hidden, or output layer of a neural network) from normal-precision floating-point to a lower-precision number format, such as BFP. The activation values 208 can be later retrieved for use during, for example, back propagation during the training phase.

As discussed above, performance, energy usage, and storage requirements of ANNs can be improved through the use of quantized-precision floating-point formats during training and/or inference. The use of quantized-precision floating-point formats in this way can, however, have certain negative impacts on ANNs such as, but not limited to, a loss in accuracy. The technologies disclosed herein address these and potentially other considerations.

Quantization-Aware Neural Architecture Search (QNAS)

Figure 3:
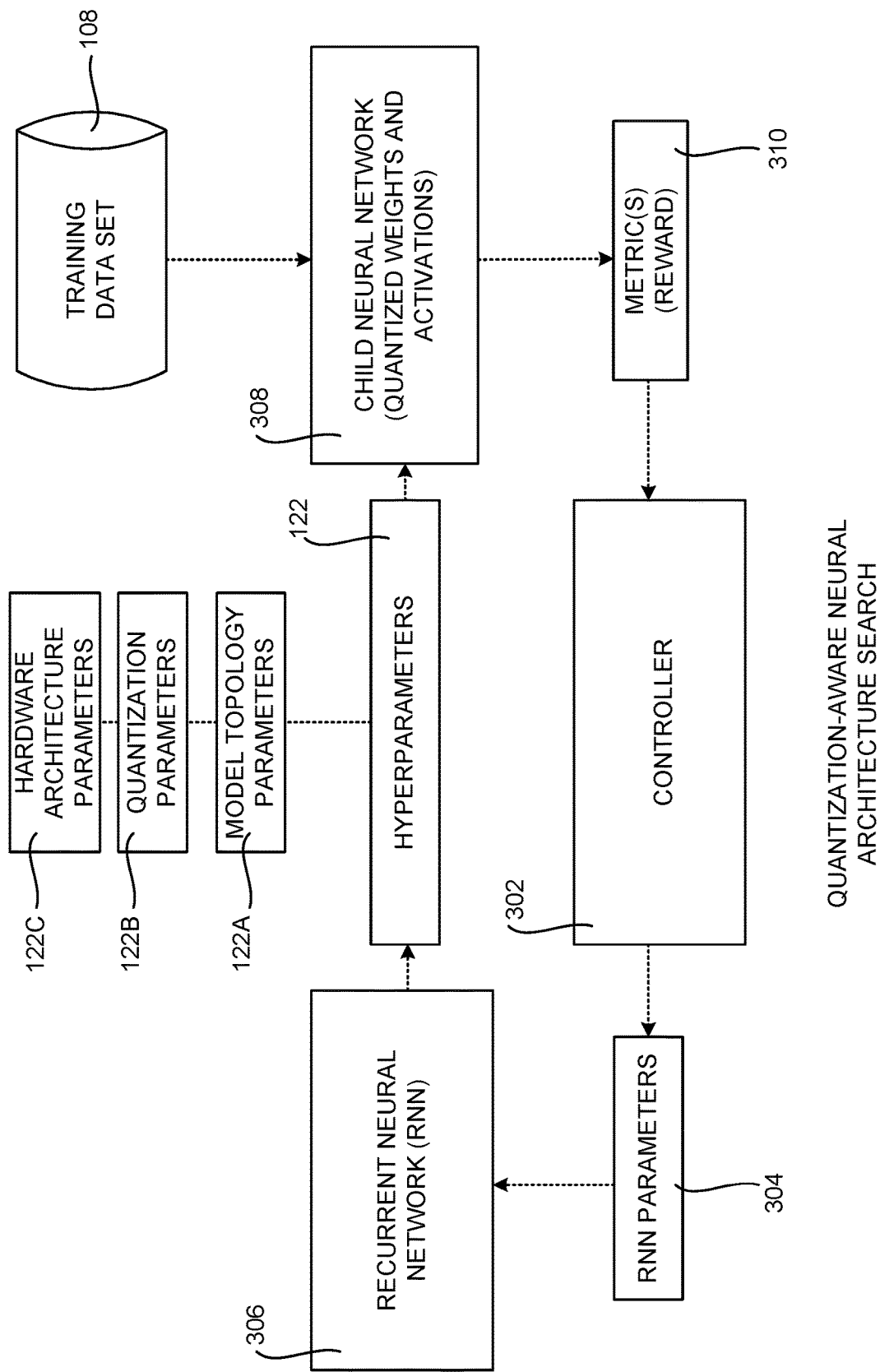
FIG. 3 is a computing architecture diagram that shows aspects of the configuration of a computing system disclosed herein configured for quantization-aware neural architecture search, according to one embodiment disclosed herein.

FIG. 3 is a computing architecture diagram that shows aspects of the configuration of a computing system disclosed herein that has been configured for quantization-aware neural architecture search ("NAS"), according to one embodiment disclosed herein. NAS generally refers to a ML-based process for predicting optimized hyperparameters 122 that specify the structure and connectivity of an ANN. Hyperparameters 122 that define the structure and connectivity of an ANN are referred to herein as "model topology hyperparameters 122A." The model topology hyperparameters 122A can include, but are not limited to, parameters specifying the number of layers of an ANN, filter height, filter width, stride height, stride width, and number of filters for a layer of an ANN.

As shown in FIG. 3, the hyperparameters 122 can also include quantization parameters 122B and hardware architecture parameters 122C. Quantization parameters 122B can define a bit width for a mantissa 204 for storing activation values generated by layers of an ANN. Quantization parameters 122B might also, or alternately, define a bit width for a mantissa 204 for storing weights for an ANN. As discussed above, the activation values and weights can be represented using a quantized-precision floating-point format, such as a BFP format having a mantissa that has fewer bits than a mantissa in a normal-precision floating-point representation and a shared exponent.

As also shown in FIG. 3, the hyperparameters 122 can also include hardware architecture parameters 122C. The hardware architecture parameters 122C define aspects of the configuration of a hardware device that implements an ANN, such as a hardware configuration of an FPGA. For example, and without limitation, the hardware architecture parameters 122C might define the number of tile engines to be utilized by an FPGA when executing an ANN.

In some embodiments, a recurrent neural network ("RNN") 306 is utilized to perform the QNAS. In particular, an RNN 306 be configured to generate the hyperparameters 122, including the model topology parameters 122A and the quantization parameters 122B, for an ANN. A child neural network 308 is then configured according to the hyperparameters 122 and trained on a training data set 108. Training might proceed until convergence, for a specified number of epochs, for a fixed period of time, or according to another schedule.

Once the child neural network 308 has been trained, metrics 310 for the trained child neural network 308 can be obtained such as, but not limited to, accuracy, inference time, or inference cost. One or more of the metrics 310 can then be utilized by a controller 302 as a reward signal when generating RNN parameters 304 for performing reinforcement learning. The RNN 306 can then utilize the parameters 305 to generate a new set of hyperparameters 122, including another set of quantization parameters 122B, for another child network 308.

The process described above can then be repeated in order to create, train and evaluate another child neural network 308. This process can be repeated for a specified number of iterations or until hyperparameters 122 can be generated defining an ANN architecture that satisfies constraints on accuracy or inference time.

Following the process described above, the set of hyperparameters 122 that optimize one or more metrics 310 can be identified and utilized to create and implement a quantized ANN. For example, and without limitation, the set of hyperparameters 122 that results in an ANN that provides the highest accuracy, lowest inference time, and/or lowest cost might be selected and utilized to instantiate an ANN.

In some embodiments, the performance of the mechanism described above can be improved using parallelism. For instance, child networks 308 can be trained in parallel in order to speed up the learning process of the RNN 306. Such a mechanism can use replicas of the controller that sample different child neural network 308 architectures and train them in parallel.

Figure 4:
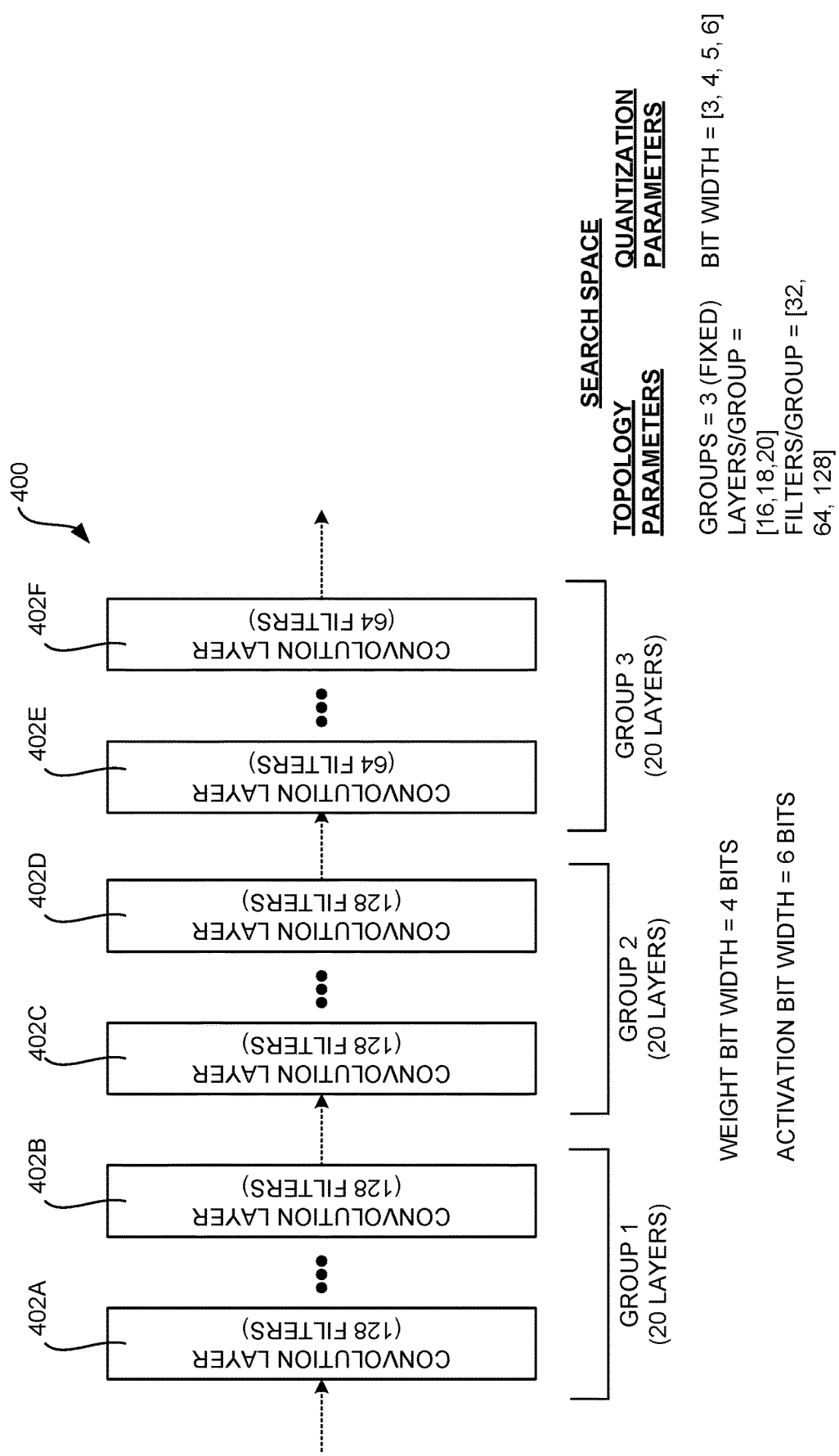
FIG. 4 is a neural network architecture diagram that illustrates aspects of the various processes described herein for quantization-aware neural architecture search, with reference to a simplified topology of an example ANN.

FIG. 4 is a neural network architecture diagram that illustrates aspects of the various processes described above for QNAS with reference to a simplified topology of an example ANN 400. In this example, the QNAS process described above was performed with a search space that includes model topology parameters 122A and quantization parameters 122B. In this example, the search space for the model topology parameters 122A was limited to three groups of layers 402A-402F, 16, 18, or 20 layers 402A-204F per group, and 32, 64, or 128 filters per group. The search space for the quantization parameters 122B included bit widths of 3, 4, 5, and 6 bits for the mantissa of the weights 110 and activation values when represented in a BFP format.

As described above, application of the QNAS process described above will result in various combinations of hyperparameters 122, each representing a different ANN architecture. Each of the architectures will have values for metrics 310 such as, but not limited to, accuracy, inference time, and cost. An architecture can be selected from among the generated architectures (i.e. hyperparameters 122) that optimizes one or more desired metrics 310.

In the example shown in FIG. 4, the results of the QNAS process described above generates hyperparameters 122 including model topology parameters 122A defining an ANN having three groups of 20 layers, with the layers 402A and 204B of group one having 128 filters, the layers 402C and 402D of group two having 128 filters, and the layers 402E and 402F of the third group having 64 filters. Additionally, the hyperparameters 122 for the example shown in FIG. 4 include quantization parameters 122B indicating that the bit width for the mantissa 204 used to represent weights 110 in a BFP is four bits and the mantissa 204 used to represent activation values in a BFP is six bits. As discussed above, the hyperparameters 122 might include other types of parameters defining other aspects of an ANN architecture, quantization scheme, or hardware architecture utilized to execute the ANN.

Figure 5:
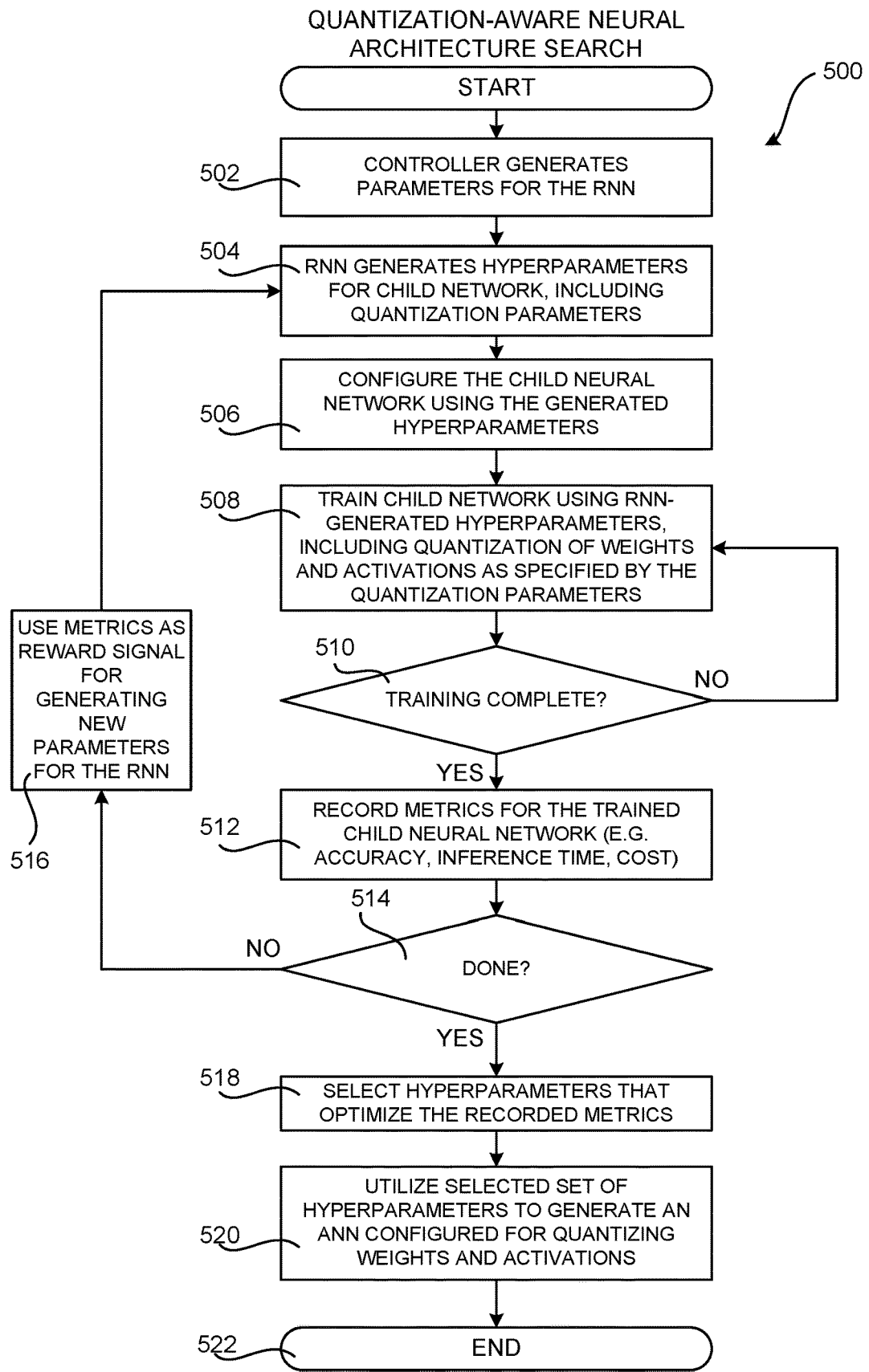
FIG. 5 is a flow diagram showing a routine that illustrates aspects of an illustrative computer-implemented process for quantization-aware neural architecture search, according to one embodiment disclosed herein.

Referring now to FIG. 5, a flow diagram showing a routine 500 will be described that shows aspects of an illustrative computer-implemented process for quantization-aware neural architecture search. It should be appreciated that the logical operations described herein with regard to FIG. 5, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 500 begins at operation 502, where the controller 302 generates RNN parameters 304 for the RNN 306. The routine 500 then proceeds from operation 502 to operation 504, where the RNN 306 generates the hyperparameters 122, including model topology parameters 122A and the quantization parameters 122B, for an ANN. The routine 500 then proceeds from operation 504 to operation 506.

At operation 506, the child neural network 308 is configured using the hyperparameters 122 generated at operation 504. For example, the structure and quantization mechanism for the child neural network 308 can be configured based on the hyperparameters 122. The routine 500 then proceeds from operation 506 to operation 508, where the configured child network 308 is trained on a training data set 108. As discussed above training might proceed until convergence, for a specified number of epochs, for a fixed period of time, or according to another schedule.

Once training of the child neural network 308 has completed, the routine 500 proceeds from operation 510 to operation 512, where metrics 310 for the trained child neural network 308 can be obtained and recorded such as, but not limited to, accuracy, inference time, or inference cost. The routine 500 then proceeds from operation 512 to operation 514, where a determination is made as to whether process described above is to continue. For example, the process described above can be repeated for a specified number of iterations or until hyperparameters 122 can be generated defining an ANN architecture that satisfies constraints on accuracy or inference time. If the process is not complete, the routine 500 proceeds from operation 514 to operation 516, where one or more of the metrics 310 are utilized by the controller 302 as a reward signal when generating RNN parameters 304 for performing reinforcement learning.

From operation 516, the routine 500 proceeds back to operation 504, where the process described can be repeated. For example, the RNN 306 can generate a new set of hyperparameters 122, including another set of quantization parameters 122B, for another child network 308. In this way, the process described above can then be repeated in order to create, train and evaluate another child neural network 308. This process can be repeated for a specified number of iterations or until hyperparameters 122 can be generated defining an ANN architecture that satisfies constraints on accuracy or inference time.

Once the search process has completed, the routine 500 proceeds from operation 514 to operation 518, where a set of hyperparameters 122 that optimize one or more metrics 310 can be selected. For example, a set of hyperparameters 122 that optimizes accuracy might be selected. The routine 500 then continues from operation 518 to operation 520, where the hyperparameters 122 selected at operation 518 can be utilized to create and implement a quantized ANN. For example, and without limitation, the set of hyperparameters 122 that results in an ANN that provides the highest accuracy, lowest inference time, and/or lowest cost might be selected and utilized to instantiate an ANN. The routine 500 then proceeds from operation 520 to operation 522, where it ends.

Figure 6:
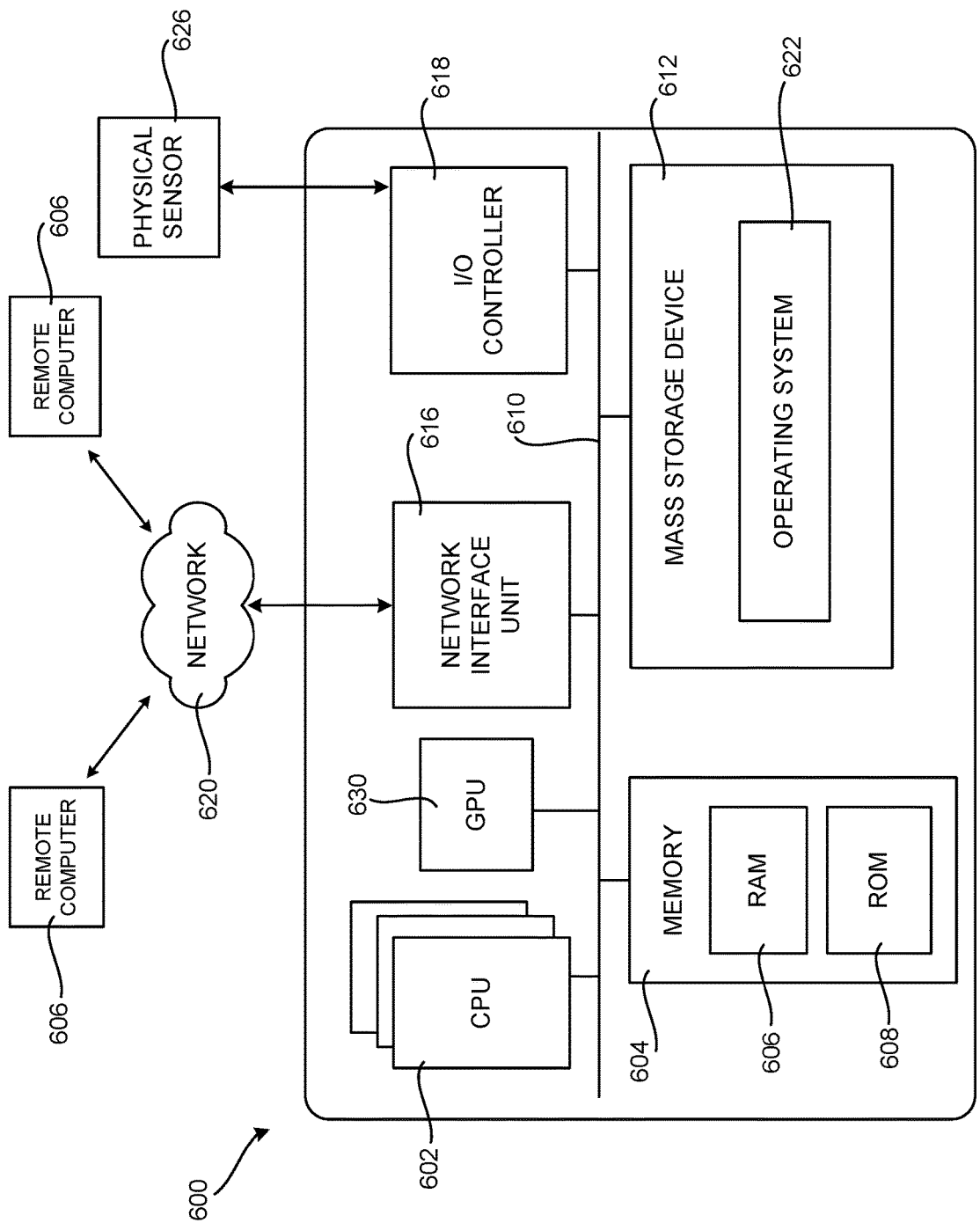
FIG. 6 is a computer architecture diagram showing an illustrative computer hardware and software architecture for a computing device that can implement aspects of the technologies presented herein.

FIG. 6 is a computer architecture diagram showing an illustrative computer hardware and software architecture for a computing device that can implement the various technologies presented herein. In particular, the architecture illustrated in FIG. 6 can be utilized to implement a server computer, mobile phone, an e-reader, a smartphone, a desktop computer, an alternate reality or virtual reality ("AR/VR") device, a tablet computer, a laptop computer, or another type of computing device.

While the subject matter described herein is presented in the general context of server computers performing training of an ANN, those skilled in the art will recognize that other implementations can be performed in combination with other types of computing systems and modules. Those skilled in the art will also appreciate that the subject matter described herein can be practiced with other computer system configurations, including hand-held devices, multi-processor systems, microprocessor-based or programmable consumer electronics, computing or processing systems embedded in devices (such as wearable computing devices, automobiles, home automation etc.), minicomputers, mainframe computers, and the like.

The computer 600 illustrated in FIG. 6 includes one or more central processing units 602 ("CPU"), one or more GPUs 630, a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, can be stored in the ROM 608. The computer 600 further includes a mass storage device 612 for storing an operating system 622, application programs, and other types of programs. The mass storage device 612 can also be configured to store other types of programs and data.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 620. The computer 600 can connect to the network 620 through a network interface unit 616 connected to the bus 610. It should be appreciated that the network interface unit 616 can also be utilized to connect to other types of networks and remote computer systems. The computer 600 can also include an input/output controller 618 for receiving and processing input from a number of other devices, including a keyboard, mouse, touch input, an electronic stylus (not shown in FIG. 6), or a physical sensor such as a video camera. Similarly, the input/output controller 618 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer storage media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
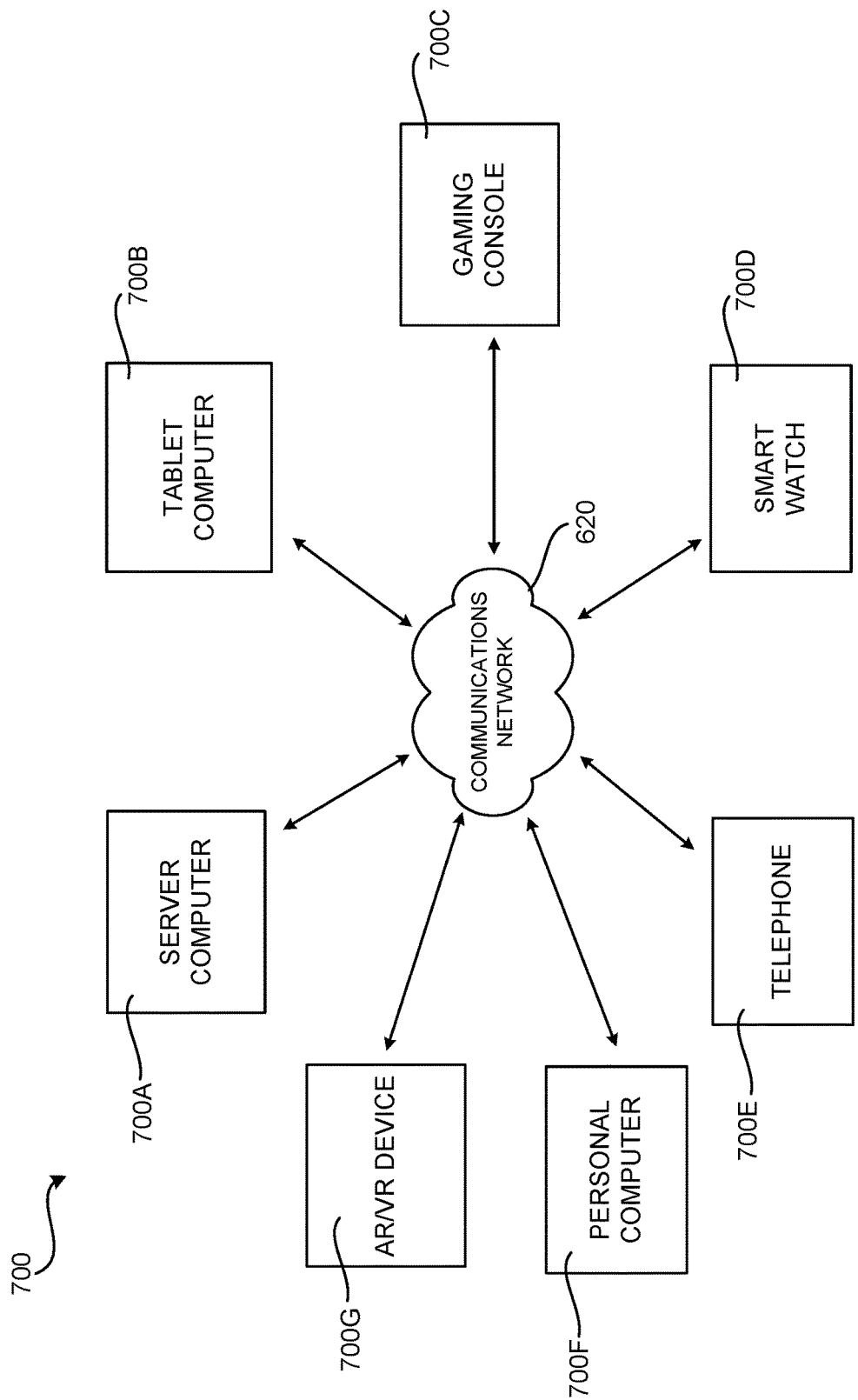
FIG. 7 is a network diagram illustrating a distributed computing environment in which aspects of the disclosed technologies can be implemented.

FIG. 7 is a network diagram illustrating a distributed network computing environment 700 in which aspects of the disclosed technologies can be implemented, according to various configurations presented herein. As shown in FIG. 7, one or more server computers 700A can be interconnected via a communications network 620 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 700B, a gaming console 700C, a smart watch 700D, a telephone 700E, such as a smartphone, a personal computer 700F, and an AR/VR device 700G.

In a network environment in which the communications network 620 is the Internet, for example, the server computer 700A can be a dedicated server computer operable to process and communicate data to and from the client computing devices 700B-700G via any of a number of known protocols, such as, hypertext transfer protocol ("HTTP"), file transfer protocol ("FTP"), or simple object access protocol ("SOAP"). Additionally, the networked computing environment 700 can utilize various data security protocols such as secured socket layer ("SSL") or pretty good privacy ("PGP"). Each of the client computing devices 700B-700G can be equipped with an operating system operable to support one or more computing applications or terminal sessions such as a web browser (not shown in FIG. 7), other graphical user interface (not shown in FIG. 7), or a mobile desktop environment (not shown in FIG. 7) to gain access to the server computer 700A.

The server computer 700A can be communicatively coupled to other computing environments (not shown in FIG. 7) and receive data regarding a participating user's interactions/resource network. In an illustrative operation, a user (not shown in FIG. 7) may interact with a computing application running on a client computing device 700B-700G to obtain desired data and/or perform other computing applications.

The data and/or computing applications may be stored on the server 700A, or servers 700A, and communicated to cooperating users through the client computing devices 700B-700G over an exemplary communications network 620. A participating user (not shown in FIG. 7) may request access to specific data and applications housed in whole or in part on the server computer 700A. This data may be communicated between the client computing devices 700B-700G and the server computer 700A for processing and storage.

The server computer 700A can host computing applications, processes and applets for the generation, authentication, encryption, and communication of data and applications, and may cooperate with other server computing environments (not shown in FIG. 7), third party service providers (not shown in FIG. 7), network attached storage ("NAS") and storage area networks ("SAN") to realize application/data transactions.

It should be appreciated that the computing architecture shown in FIG. 7 and the distributed network computing environment shown in FIG. 7 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following examples:

Example 1: A computer-implemented method, comprising: generating, by way of a recurrent neural network (RNN), hyperparameters for a child neural network, the hyperparameters comprising model topology parameters and quantization parameters for an artificial neural network (ANN); configuring the child neural network according to the hyperparameters; training the child neural network on a training data set; following training of the child neural network, computing one or more metrics for the child neural network; and performing reinforcement learning to train the RNN to generate second hyperparameters for a second child network using the one or more metrics as a reward signal for the RNN, the second hyperparameters comprising second quantization parameters.

Example 2: The computer-implemented method of Example 1, wherein the model topology parameters define a number of filters for the ANN.

Example 3: The computer-implemented method of Examples 1 and 2, wherein the model topology parameters define a number of layers for the ANN.

Example 4: The computer-implemented method of Examples 1-3, wherein the quantization parameters define a bit width for a mantissa for storing activation values generated by layers of the ANN.

Example 5: The computer-implemented method of Examples 1-4, wherein the activation values are represented in a block floating-point format (BFP) comprising a mantissa having fewer bits than a mantissa in a normal-precision floating-point representation and a shared exponent.

Example 6: The computer-implemented method of Examples 1-5, wherein the quantization parameters define a bit width for a mantissa for storing weights for the ANN.

Example 7: The computer-implemented method of Examples 1-6, wherein the weights are represented in a block floating-point format (BFP) having a mantissa comprising fewer bits than a mantissa in a normal-precision floating-point representation and a shared exponent.

Example 8: The computer-implemented method of Examples 1-7, wherein the one or more metrics comprise one or more of accuracy, inference time, or cost.

Example 9: The computer-implemented method of Examples 1-8, wherein the hyperparameters further comprise hardware architecture parameters for configuring a field programmable gate array (FPGA).

Example 10: A computer-implemented method, comprising: generating, by way of a recurrent neural network (RNN), hyperparameters for a child neural network, the hyperparameters comprising quantization parameters for an artificial neural network (ANN); configuring the child neural network according to the hyperparameters; training the child neural network on a training data set; following training of the child neural network, computing one or more metrics for the child neural network; and performing reinforcement learning to train the RNN to generate second hyperparameters for a second child network using the one or more metrics as a reward signal for the RNN, the second hyperparameters comprising second quantization parameters.

Example 11: The computer-implemented method of Example 10, wherein the hyperparameters further comprise model topology parameters, and wherein the model topology parameters define a number of layers or a number of filters for the artificial neural network (ANN).

Example 12: The computer-implemented method of Examples 10 and 11, wherein the quantization parameters define a bit width for a mantissa for storing activation values generated by layers of the ANN or a bit width for a mantissa for storing weights for the ANN.

Example 13: The computer-implemented method of Examples 10-12, wherein the activation values and the weights are represented in a block floating-point format (BFP) having a mantissa comprising fewer bits than a mantissa in a normal-precision floating-point representation and a shared exponent.

Example 14: The computer-implemented method of Examples 10-13, wherein the one or more metrics comprise one or more of accuracy, inference time, or cost.

Example 15: The computer-implemented method of Examples 10-14, wherein the hyperparameters further comprise hardware architecture parameters for configuring a field programmable gate array (FPGA).

Example 16: A computing device, comprising: one or more processors; and at least one computer storage media having computer-executable instructions stored thereupon which, when executed by the one or more processors, will cause the computing device to: generate, by way of a recurrent neural network (RNN), hyperparameters for a child neural network, the hyperparameters comprising model topology parameters and quantization parameters for an artificial neural network (ANN); configure the child neural network according to the hyperparameters; train the child neural network on a training data set; following training of the child neural network, compute one or more metrics for the child neural network; and perform reinforcement learning to train the RNN to generate second hyperparameters for a second child network using the one or more metrics as a reward signal for the RNN, the second hyperparameters comprising second quantization parameters.

Example 17: The computing device of Example 16, wherein the quantization parameters define a bit width for a mantissa for storing activation values generated by layers of the ANN or a bit width for a mantissa for storing weights for the ANN.

Example 18: The computing device of Examples 16 and 17, wherein the activation values and the weights are represented in a block floating-point format (BFP) having a mantissa comprising fewer bits than a mantissa in a normal-precision floating-point representation and a shared exponent.

Example 19: The computing device of Examples 16-18, wherein the model topology parameters define a number of layers or a number of filters for the artificial neural network (ANN).

Example 20: The computing device of Examples 16-19, wherein the hyperparameters further comprise hardware architecture parameters for configuring a field programmable gate array (FPGA).

Based on the foregoing, it should be appreciated that technologies for quantization-aware neural architecture search have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
generating, by way of a recurrent neural network (RNN), hyperparameters for a child neural network, the hyperparameters comprising model topology parameters defining a structure and connectivity for an artificial neural network (ANN), quantization parameters defining a quantization configuration for the ANN, and hardware architecture parameters defining a number of tile engines to be utilized by a field-programmable gate array (FPGA) when executing the ANN;
configuring the child neural network according to the hyperparameters;
training the child neural network on a training data set;
following training of the child neural network, computing one or more metrics for the child neural network; and
performing reinforcement learning to train the RNN to generate second hyperparameters for a second child network using the one or more metrics as a reward signal for the RNN, the second hyperparameters comprising second model topology parameters, second quantization parameters, and second hardware architecture parameters.

2. The computer-implemented method of claim 1, wherein the model topology parameters define a number of filters for the ANN.

3. The computer-implemented method of claim 1, wherein the model topology parameters define a number of layers for the ANN.

4. The computer-implemented method of claim 1, wherein the quantization parameters define a bit width for a mantissa for storing activation values generated by layers of the ANN.

5. The computer-implemented method of claim 4, wherein the activation values are represented in a block floating-point format (BFP) comprising a mantissa and a shared exponent.

6. The computer-implemented method of claim 1, wherein the quantization parameters define a bit width for a mantissa for storing weights for the ANN.

7. The computer-implemented method of claim 6, wherein the weights are represented in a block floating-point format (BFP) having a mantissa and a shared exponent.

8. The computer-implemented method of claim 1, wherein the one or more metrics comprise one or more of accuracy, inference time, or cost.

9. A computer-implemented method, comprising:
generating, by way of a recurrent neural network (RNN), hyperparameters for a child neural network, the hyperparameters comprising model topology parameters defining a structure and connectivity for an artificial neural network (ANN), quantization parameters defining a quantization configuration for the ANN, and hardware architecture parameters defining a number of tile engines to be utilized by a field-programmable gate array (FPGA) when executing the ANN;
configuring the child neural network according to the hyperparameters;
training the child neural network on a training data set;
following training of the child neural network, computing one or more metrics for the child neural network; and
performing reinforcement learning to train the RNN to generate second hyperparameters for a second child network using the one or more metrics as a reward signal for the RNN, the second hyperparameters comprising second model topology parameters, second quantization parameters, and second hardware architecture parameters.

10. The computer-implemented method of claim 9, wherein the model topology parameters define a number of layers or a number of filters for the artificial neural network (ANN).

11. The computer-implemented method of claim 9, wherein the quantization parameters define a bit width for a mantissa for storing activation values generated by layers of the ANN or a bit width for a mantissa for storing weights for the ANN.

12. The computer-implemented method of claim 11, wherein the activation values and the weights are represented in a block floating-point format (BFP) having a mantissa and a shared exponent.

13. The computer-implemented method of claim 9, wherein the one or more metrics comprise one or more of accuracy, inference time, or cost.

14. A computing device, comprising:
one or more processors; and
at least one computer storage media having computer-executable instructions stored thereupon which, when executed by the one or more processors, will cause the computing device to:
generate, by way of a recurrent neural network (RNN), hyperparameters for a child neural network, the hyperparameters comprising model topology parameters defining a structure and connectivity for an artificial neural network (ANN), quantization parameters defining a quantization configuration for the ANN, and hardware architecture parameters defining a number of tile engines to be utilized by a field-programmable gate array (FPGA) configured to execute the ANN;
configure the child neural network according to the hyperparameters;
train the child neural network on a training data set;
following training of the child neural network, compute one or more metrics for the child neural network; and
perform reinforcement learning to train the RNN to generate second hyperparameters for a second child network using the one or more metrics as a reward signal for the RNN, the second hyperparameters comprising second model topology parameters, second quantization parameters, and second hardware architecture parameters.

15. The computing device of claim 14, wherein the quantization parameters define a bit width for a mantissa for storing activation values generated by layers of the ANN or a bit width for a mantissa for storing weights for the ANN.

16. The computing device of claim 15, wherein the activation values and the weights are represented in a block floating-point format (BFP) having a mantissa and a shared exponent.

17. The computing device of claim 14, wherein the model topology parameters define a number of layers or a number of filters for the artificial neural network (ANN).

* * * * *